Oct. 23, 1934.  J. L. GILMORE  1,977,722
SECOND SPARE WHEEL CARRIER
Filed Nov. 3, 1932
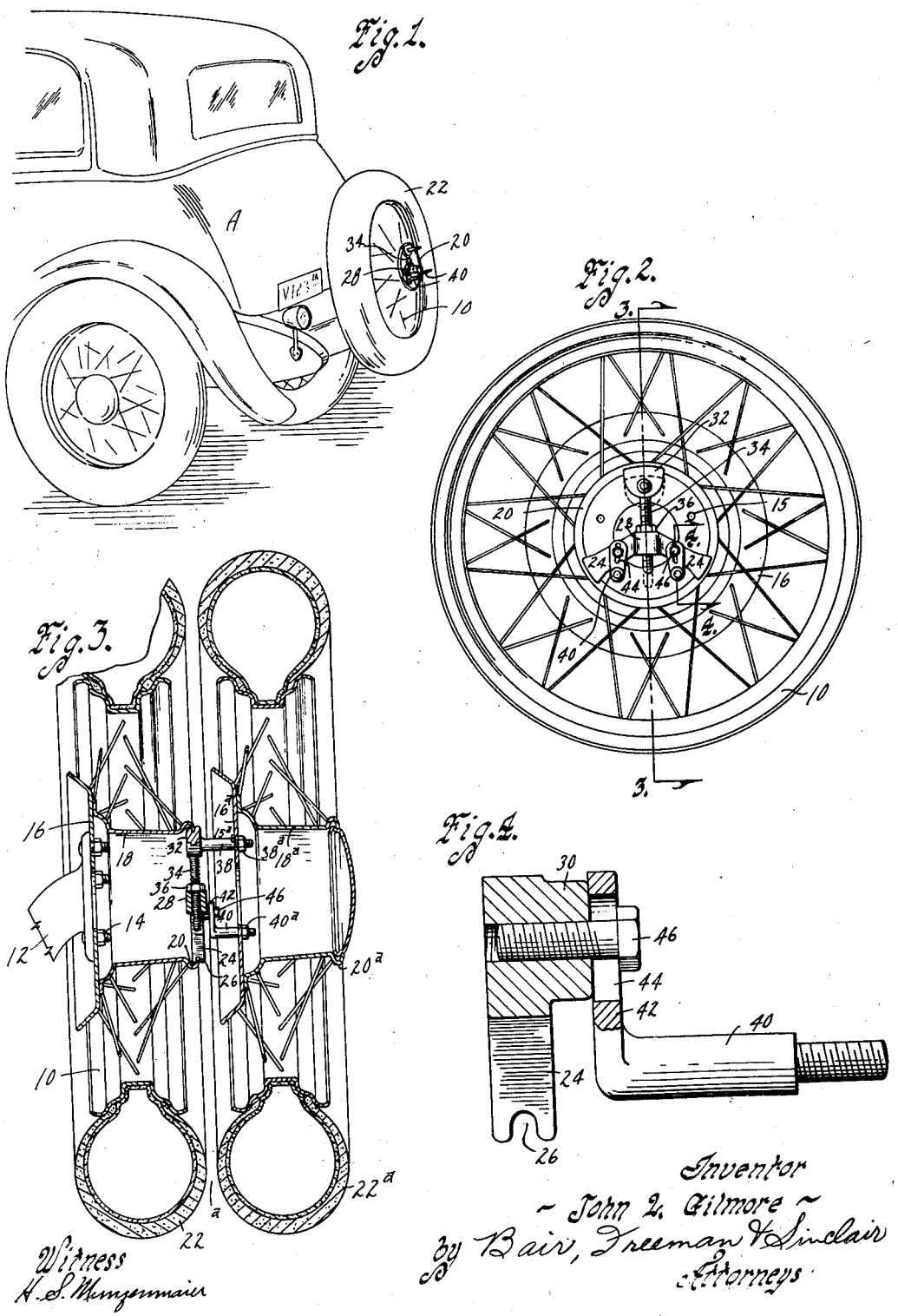

Patented Oct. 23, 1934

1,977,722

UNITED STATES PATENT OFFICE 1,977,722

SECOND SPARE WHEEL CARRIER

John L. Gilmore, Kansas City, Mo.

Application November 3, 1932, Serial No. 641,005

2 Claims. (Cl. 224—29)

An object of my present invention is to provide a second spare wheel carrier for automobiles, the carrier being comparatively simple and inexpensive to produce from a manufacturing standpoint.

A further object is to provide a second spare wheel carrier which comprises a pair of clamp members expansible relative to each other and grooved so that they can fit in a flange of a hub of a spare wheel and when expanded, will be rigidly supported relative thereto, means being provided for supporting a spare tire on the clamp members in addition to the tire already supported on the spare wheel, the carrier being arranged to rigidly position the two tires spaced from each other so that there is no rubbing and chafing between them.

A further object is to provide on the clamp members, a shouldered bolt and a pair of arms with shouldered bolts thereon, the arms being swingably and slidably mounted relative to the clamp members so that they can be adjusted relative to each other and being adapted for entering bolt holes of a second spare wheel for supporting it relative to the first spare wheel.

More particularly, it is my object to provide a spare tire carrier comprising an inverted V-shaped member having grooves in its ends, a second member having a groove in one of its ends and telescopically mounted relative to the first member and shouldered bolts carried by the members for mounting a second spare wheel relative to a first one.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a perspective view of the rear end of an automobile showing a spare wheel and tire thereon with my second spare wheel carrier mounted in position for use.

Figure 2 is a rear elevation of the spare wheel and carrier shown in Figure 1 with the spare tire removed.

Figure 3 is a vertical sectional view on the line 3—3 of Figure 2 showing the spare wheel and carrier of Figure 2 and in addition, a second spare wheel with tires on both the first and second wheels; and Figure 4 is an enlarged sectional view on the line 4—4 of Figure 2.

On the accompanying drawing, I have used the reference character A to indicate generally an automobile. A spare wheel 10 is mounted thereon, a bracket 12 being used for the mounting and bolts 14 being used to bolt a hub flange 16 of the spare wheel 10 on the bracket 12. The spare wheel has a hub 18 and a second hub flange 20, as illustrated in Figure 3. A spare tire 22 is mounted on the spare wheel.

The foregoing description is of an ordinary spare wheel and tire as found on an automobile. My invention is particularly adapted for wire spoke wheels, although it can be used for other wheels as well. It is immaterial whether the wheel is mounted at the rear of the automobile or on the side thereof.

My second spare wheel carrier includes an inverted V-shaped member 24 having grooved ends 26, a central hub 28 and a pair of hubs 30 between the grooved ends and the hub 28.

It further includes a grooved head 32 on a bolt 34 which is telescopically mounted relative to the boss 28 and a nut 36. My carrier further includes a single shouldered bolt 38 on the head 32 and a pair of shouldered bolts 40 formed on arms 42. The arms 42 are slotted as indicated at 44 and cap screws 46 extend through the slots and into the hubs 30.

My second spare wheel carrier is adapted, when contracted to the dotted line position of Figure 2, to be positioned within the flange 20 of the hub 18 and thereafter to be expanded to the full line position of Figure 2 by running the nut 36 down against the boss 28. When the nut is tightened, the carrier is rigidly supported on the spare wheel 10.

A second spare wheel is shown having a hub flange 16a, a hub 18a, a hub flange 20a and a second spare tire 22a. The flange 16 is provided with bolt holes 15 for the bolts 14. The flange 16a is provided with bolt holes 15a for the bolts 38 and 40. Nuts 38a and 40a are provided for fastening the spare wheel on the bolts 38 and 40. Thus the second spare wheel and its spare tire 22a are rigidly supported relative to the spare wheel 10 and its spare tire 22, the tires being spaced as indicated at a in Figure 3 so there is no danger of them rubbing together and chafing each other.

The expansible construction of the members 24 and 32 provides for ready attachment of the carrier to hub flanges 20 of various diameters. The swingable and slidable connection of each arm 42 to the member 24 provides for adjustment of the bolts 40 so that bolt holes 15a arranged on different sized radii and having a different number of openings around the circle of bolt holes may be accommodated. Thus the carrier is universally adjustable for different spare wheels and second spare wheels.

Although I have shown the carrier for mounting a second spare wheel, it is obvious that a rim can be mounted on it or some means other than a second spare wheel can be provided for supporting a second spare tire relative to the first spare wheel and tire.

The change just noted and others as well can be made without departing from the real spirit and purpose of my invention, and it is my intention to cover by my claims, any modified forms of structure or use of mechanical equivalents, which may be reasonably included within their scope.

I claim as my invention:

1. For use with a spare wheel hub, a second spare wheel carrier comprising a V-shaped arm having slotted ends and a central hub, a bolt slidable through said hub and having a slotted head, a nut on said bolt to impart sliding movement to the bolt relative to the V-shaped arm, the slots of said V-shaped arm and said head being cooperable with a hub flange of a spare wheel with said hub flange received in said slots, a pair of L-shaped brackets, one arm of each bracket being threaded and the other arm being slotted, a clamping bolt for each bracket extending through the slot thereof and said clamping bolts coacting with said V-shaped arm on opposite sides of said hub, a threaded stud extending from the slotted head of said bolt, said threaded arms of said brackets and said stud extending at substantially right angles to the plane of the slotted ends of said V-shaped arm and said slotted head of said bolt and their outer ends being shouldered and nuts on the ends thereof beyond their shoulders.

2. For use with a spare wheel hub, a second spare wheel carrier comprising a V-shaped arm having slotted ends and a central hub, a bolt slidable through said hub and having a slotted head, a nut on said bolt to impart sliding movement to the bolt relative to the V-shaped arm, the slots of said V-shaped arm and said head being cooperable with a hub flange of a spare wheel with said hub flange received in said slots, a pair of L-shaped brackets, one arm of each bracket being threaded and the other arm being slotted, a clamping bolt for each bracket extending through the slot thereof and said clamping bolts coacting with said V-shaped arm on opposite sides of said hub and a threaded stud extending from the slotted head of said bolt, said threaded arms of said brackets and said stud extending at substantially right angles to the plane of the slotted ends of said V-shaped arm and said slotted head of said bolt and being cooperable with hub bolt holes of a second spare wheel.

JOHN L. GILMORE.